United States Patent
Nix et al.

(10) Patent No.: US 7,142,978 B2
(45) Date of Patent: Nov. 28, 2006

(54) NAVIGATION SYSTEM WITH MAP AND POINT OF INTEREST DATABASES

(75) Inventors: Axel Nix, Birmingham, MI (US); Andrew W. Gellatly, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 223 days.

(21) Appl. No.: 10/850,765

(22) Filed: May 21, 2004

(65) Prior Publication Data

US 2005/0261825 A1  Nov. 24, 2005

(51) Int. Cl.
*G01C 21/26* (2006.01)
(52) U.S. Cl. ............ 701/201; 701/207; 701/208; 701/209; 340/988
(58) Field of Classification Search ........ 701/200, 701/201, 207, 208, 209, 212; 340/988, 995.1
See application file for complete search history.

(56) References Cited

U.S. PATENT DOCUMENTS

| | | | | |
|---|---|---|---|---|
| 4,849,827 A | * | 7/1989 | Hashimoto et al. | 386/108 |
| 5,790,975 A | * | 8/1998 | Kashiwazaki et al. | 701/208 |
| 6,721,236 B1 | * | 4/2004 | Eschke et al. | 369/6 |
| 2002/0140635 A1 | * | 10/2002 | Saitou et al. | 345/30 |
| 2004/0190869 A1 | * | 9/2004 | Chou | 386/95 |
| 2004/0236504 A1 | * | 11/2004 | Bickford et al. | 701/207 |

* cited by examiner

*Primary Examiner*—Gertrude A. Jeanglaude
(74) *Attorney, Agent, or Firm*—Laura C. Hargitt

(57) ABSTRACT

Methods and apparatus are provided for generating route instructions on a turn-by-turn navigation system in a vehicle. Turn instructions can include a turn icon as well as visual and audio prompts. The turn-by-turn navigation system typically includes a dual-use disk changer configured for both audio and Map/POI disk access. Separate Map and POI database disks are typically installed in dedicated slots of the disk changer and are designed to minimize switching time, while audio disks can be installed in the remaining slots. Moreover, audio playback buffering can be employed to enable audio-to-navigation-to-audio disk switching without interrupting audio playback. The turn-by-turn navigation system can generally be produced more economically than a typical premium system with a full complement of costly features, such as a color map display, since the turn-by-turn navigation system can be configured with only those features deemed most useful to a broad-based market segment.

14 Claims, 8 Drawing Sheets

NAVIGATION SYSTEM WITH MAP AND POINT OF INTEREST DATABASES

TECHNICAL FIELD

The present invention generally relates to navigation systems for automobiles, and more particularly relates to a turn-by-turn navigation system integrated with an automobile radio.

BACKGROUND

Recent trends in automobile technology have included the development of navigation systems incorporated within the driver control cluster. These navigation systems are generally designed to help a driver reach a specific destination without using a physical road map. As such, an automobile navigation system can make the driving experience more convenient and enjoyable.

In addition to providing basic driving directions, some navigation systems also supply resource locations, such as restaurants, hospitals, points of interest, and so forth. However, as new features and capabilities are added to automobile navigation systems, the interaction between driver and navigation system can become relatively complex. Therefore, it is desirable to have a driver-to-navigation system control interface that is both convenient and intuitive, in order to minimize driver distraction.

Another consideration affecting the design of automobile navigation systems is the cost associated with implementing various sophisticated features, such as color map displays, synthesized speech commands, touch screens, and the like. As such, the cost/feature trade-off typically becomes a determining factor regarding the degree of complexity designed into a navigation system for the consumer market. Furthermore, the relatively high cost of current "premium" navigation systems, which typically include a profusion of high-tech features, generally limits their marketability to the luxury, or near-luxury, car market.

Accordingly, it is desirable to provide a relatively low cost automobile navigation system that provides route guidance information to a typical consumer/driver. In addition, it is desirable that the low cost automobile navigation system be incorporated into the automobile audio system for convenient and intuitive operation. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for a turn-by-turn navigation system for a vehicle. One exemplary embodiment comprises a control unit with a visual display that is typically integrated into the audio system of the vehicle. The audio system can include a radio configured to receive various types of reception, such as AM, FM, SDARS, and RDS, among others. A processor is typically electrically coupled to the control unit, and to a database and a vehicle location apparatus, such as a GPS receiver. The exemplary processor is configured to receive vehicle location data from the vehicle location apparatus, to receive a destination selection from the control unit, to retrieve road-network/address data from the database, and to generate route information between the vehicle location and the destination selection.

The database may be implemented using a dual-use internal CD-ROM changer (CDX) capable of playing both audio and navigation CDs, although any suitable type of media changer may be used, such as DVD or the like. The CDX typically includes one or more dedicated slots for the navigation disks, which may include a Map (road-network/address) database, a Point Of Interest (POI) database or the like, and with the remaining slots in the CDX available for audio disks. The dedicated navigation slots are generally optimized for minimal change time, and are switched automatically as needed by the navigation system. Using separate Map and POI databases allows for individual upgrading and/or replacement of the disks. Moreover, the audio playback can be buffered in a memory to maintain uninterrupted audio playback whenever the navigation system may need to temporarily access a navigation disk for route recalculation.

In a further embodiment, the turn-by-turn navigation system includes voice prompts that are synchronized with the visual instructions and graphics, such as a turn icon, to help the driver navigate accurately, and with minimum visual distraction. The exemplary navigation system typically utilizes turn-by-turn instructions in place of a color map display, and provides those features generally considered to be most useful for a shopping/commuting type of driver. As such, the exemplary system represents an effective and economical alternative to a relatively high cost premium navigation system.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of automobile navigation systems. The exemplary embodiments disclosed herein are particularly configured for the type of user/driver that represents a broad segment of the consumer market. That is, the exemplary navigation system embodiments are especially configured for ease of use, flexibility, and minimal driver distraction. Moreover, the navigation system controls are integrated into the vehicle audio system for added convenience and intuitive operation. The exemplary embodiments provide a wide range of audio and navigation capabilities, while at the same time eliminating certain types of high cost features (e.g., a color map display) having relatively low perceived utility to certain users. As such, the exemplary embodiments represent effective, lower cost alternatives to the premium types of automobile navigation systems.

Figure 1:
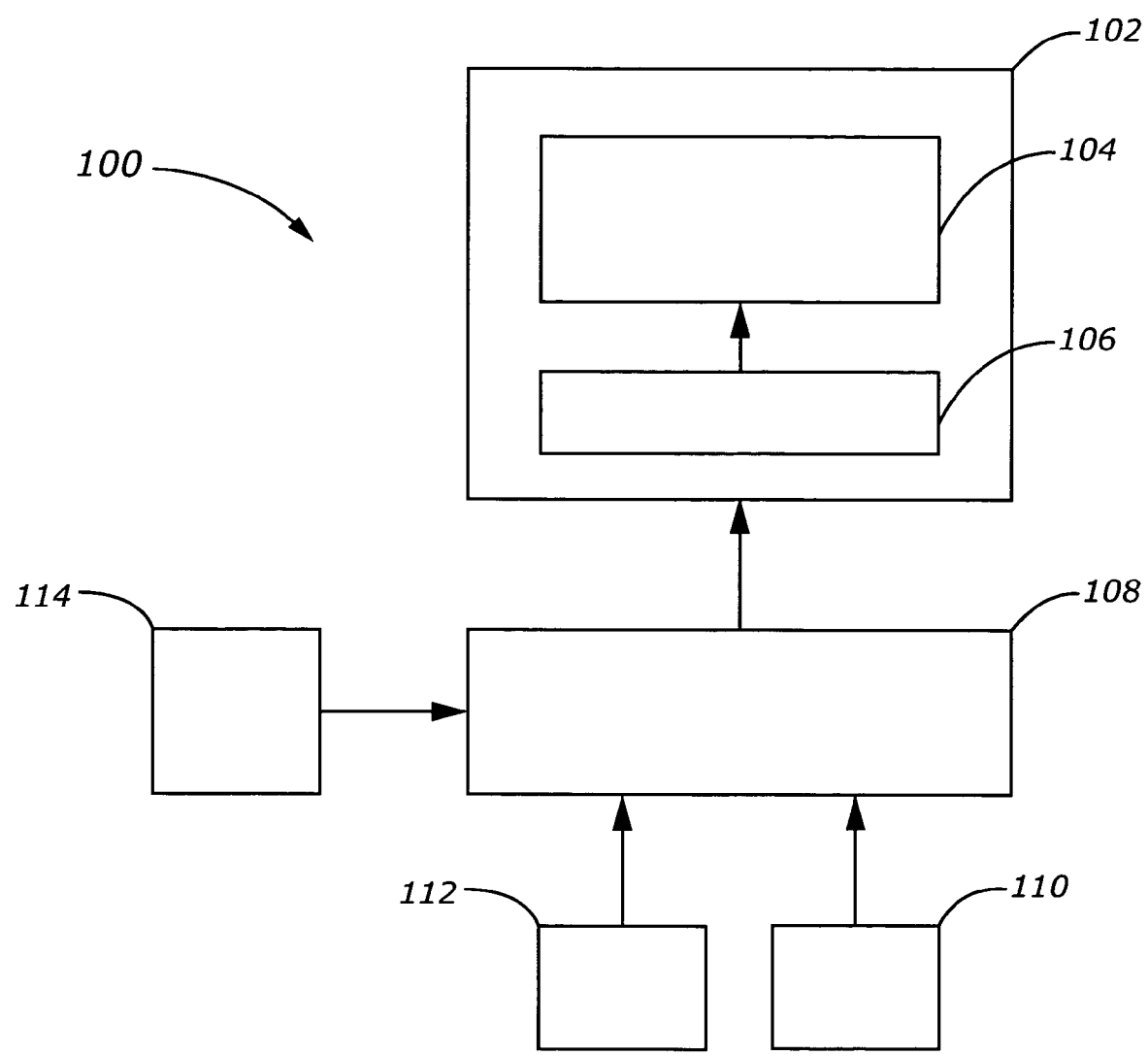
FIG. 1 is a block diagram of an exemplary automobile navigation system.

According to an exemplary embodiment of an automobile navigation system 100, as shown in the simplified block diagram of FIG. 1, a control panel 102 provides the interface between the driver and system 100. Control panel 102 typically includes a visual display 104 and a set of manual controls 106, such as buttons, knobs, and the like. A processor 108 manages the flow of data between control panel 102 and the various input devices, including a Global Positioning Satellite (GPS) receiver 110, a radio 112, database 114, and the like.

Processor 108 may be any type of microprocessor, microcontroller, or other computing device capable of executing instructions in any computing language. GPS receiver 110 provides vehicle positioning information to processor 108, typically via an external GPS antenna (not shown), or any other suitable device. Radio 112 is generally connected to an external AM/FM antenna (not shown), for receiving AM and FM broadcast transmissions, and can also be configured to receive other types of signals, such as satellite digital audio radio service (SDARS) and RDS (Radio Data System) signals. Database 114 is typically configured to provide map data, such as road-network/address data for the U.S. and Canada, to processor 108. In addition, database 114 can be further configured to provide other types of data, such as Point Of Interest (POI) data. Database 114 can be implemented by a form of disk media, such as CD, DVD, and the like, or can be implemented by any other suitable type of media, such as flash memory cards or the like. Database 114 can also be configured to provide audio playback capabilities, including CD, DVD, MP3, WMA, and so forth.

Figure 2:
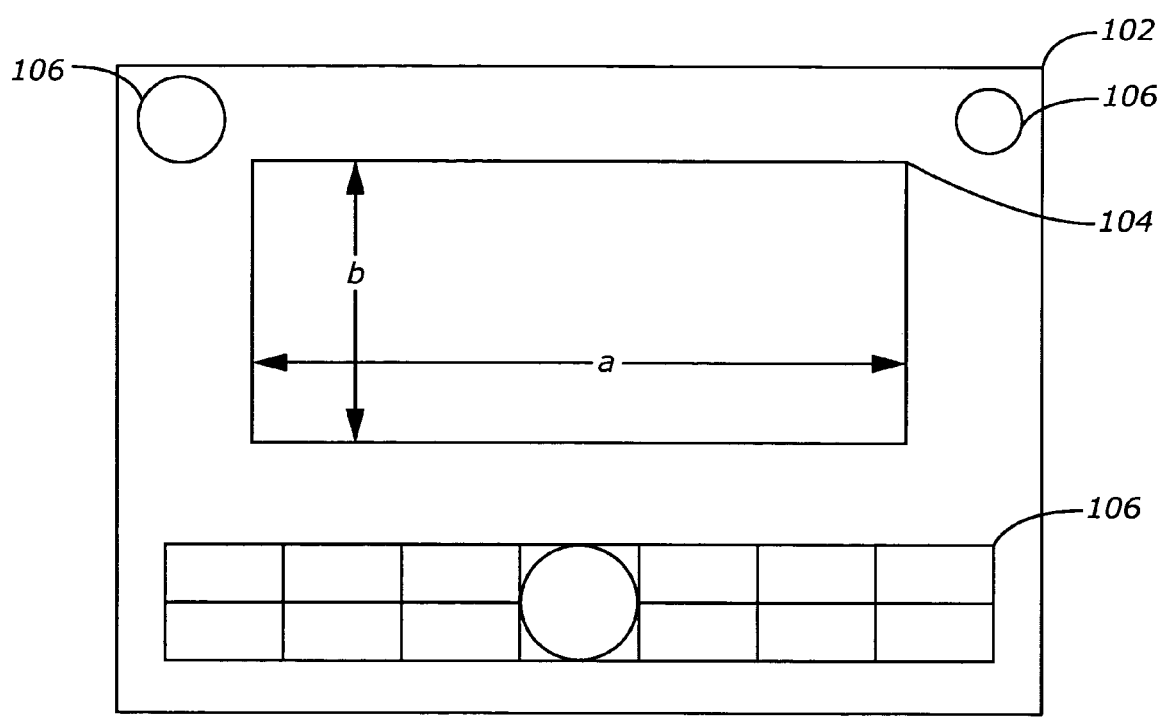
FIG. 2 is an illustration of an exemplary control panel for an automobile navigation system.

One exemplary physical embodiment of control panel 102 is illustrated in FIG. 2. Control panel 102 can be mounted in any suitable location that allows the driver to conveniently read the data on display 104 and to access controls 106. Display 104 may be sized to be capable of displaying at least 5 lines of 24 characters each, with a minimum character height of approximately 5 mm, although other embodiments may have any dimensions and display resolution. These parameters generally result in a display 104 having dimensions of approximately 125 mm minimum width (a) and approximately 47 mm minimum height (b). In general, LCD technology is used to produce the display characters, although any other suitable display technique (e.g., plasma or the like) may be used. Controls 106 are suitably configured to provide a combination of buttons and knob(s) that enable the driver to conveniently and intuitively access both the radio and navigation features, as will be described in further detail below.

Figure 3:
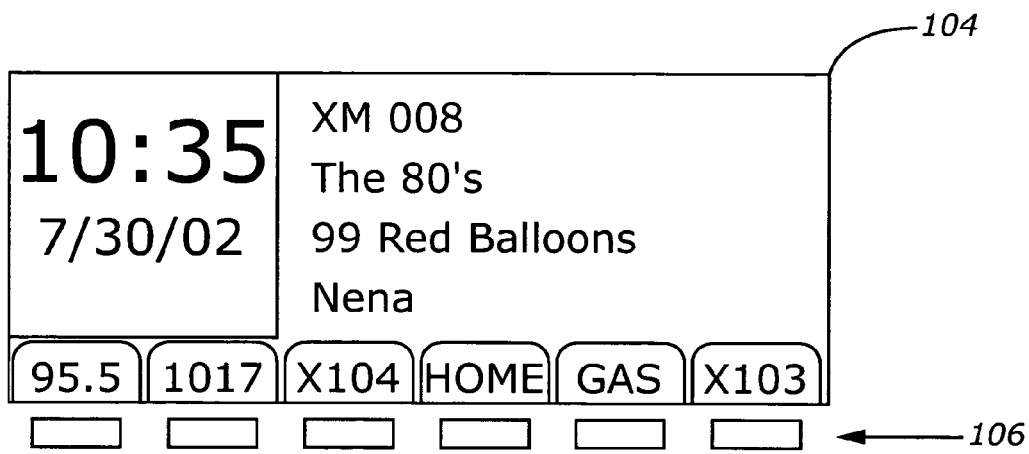
FIG. 3 is an illustration of an exemplary control panel display in the "Radio Only" mode.

According to one exemplary embodiment, control panel 102 can be configured to operate in three distinct display modes, which can be toggled by pressing an appropriate button 106 or other control on display 102. In the exemplary embodiment, the three display modes are characterized as "Radio Only" mode, "Navigation Only" mode, and "Split Radio/Nav" mode. Exemplary embodiments of the three display modes are illustrated in FIGS. 3, 4 and 5.

The "Radio Only" display mode is typically designated as the default mode, where the driver has not requested navigation information. As shown in FIG. 3, the "Radio Only" mode can be configured to display time and date information from processor 108, as well as radio 112 reception data, on display 104. In the FIG. 3 example, radio 112 is shown as receiving satellite (e.g., XM) data. In similar fashion, AM and FM data would typically be displayed if those modes were selected by the driver. Display 104 can also be configured to display additional selection choices (e.g., 95.5, 1017, X104, etc.) using associated controls 106, as illustrated in FIG. 3.

Figure 4:
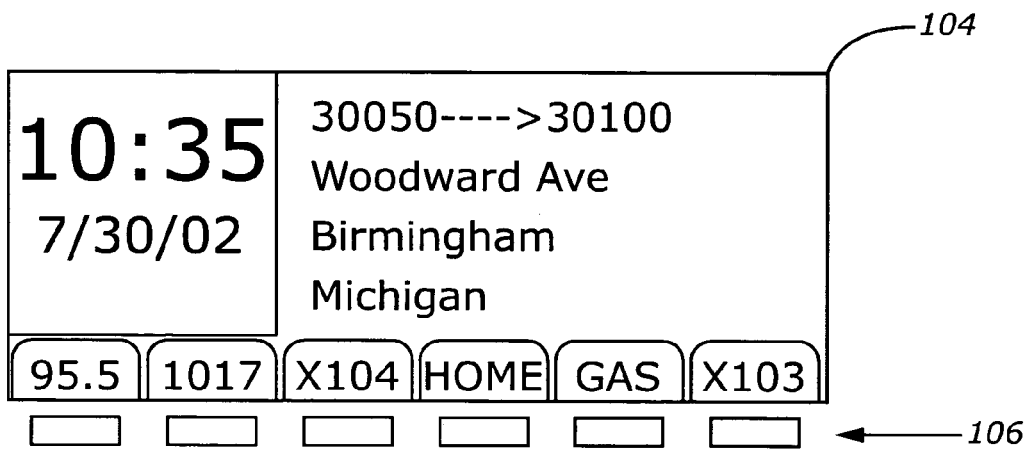
FIG. 4 is an illustration of an exemplary control panel display in the "Navigation Only" mode.

An exemplary "Navigation Only" display mode is shown in FIG. 4. In this embodiment, the vehicle location is displayed in addition to time and date information. Vehicle location is typically displayed as a default function in a Navigation mode, prior to a driver request for destination routing information. In an exemplary embodiment, vehicle location can also be displayed by driver activation of an appropriate controls 106 button. Other multi-function display mode embodiments could be used as well, such as Picture-within-Picture (PIP) and other types of graphical combinations.

Figure 5:
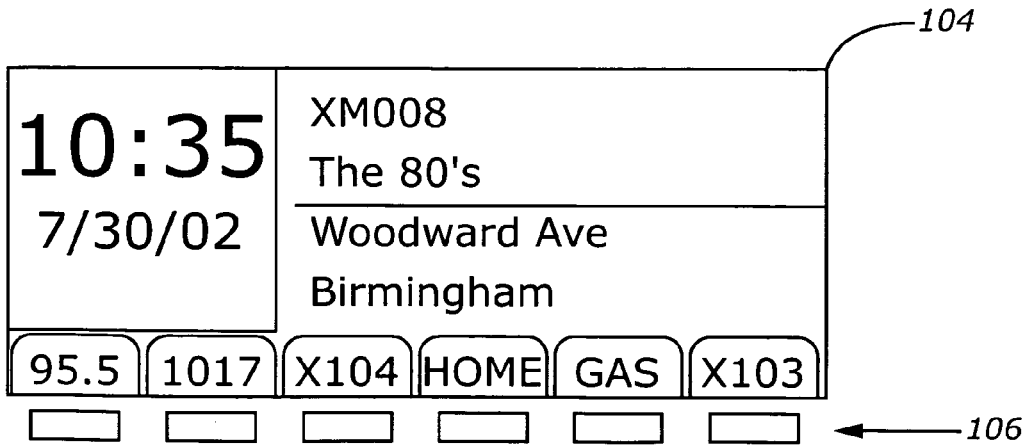
FIG. 5 is an illustration of an exemplary control panel display in the "Split Radio/Nav" mode.

An exemplary "Split Radio/Nav" display mode is illustrated in FIG. 5. In this example, the audio data (XM) and navigation data (e.g., vehicle location) are displayed on a split screen portion of display 104, in addition to the time and date display portion.

Figure 6:
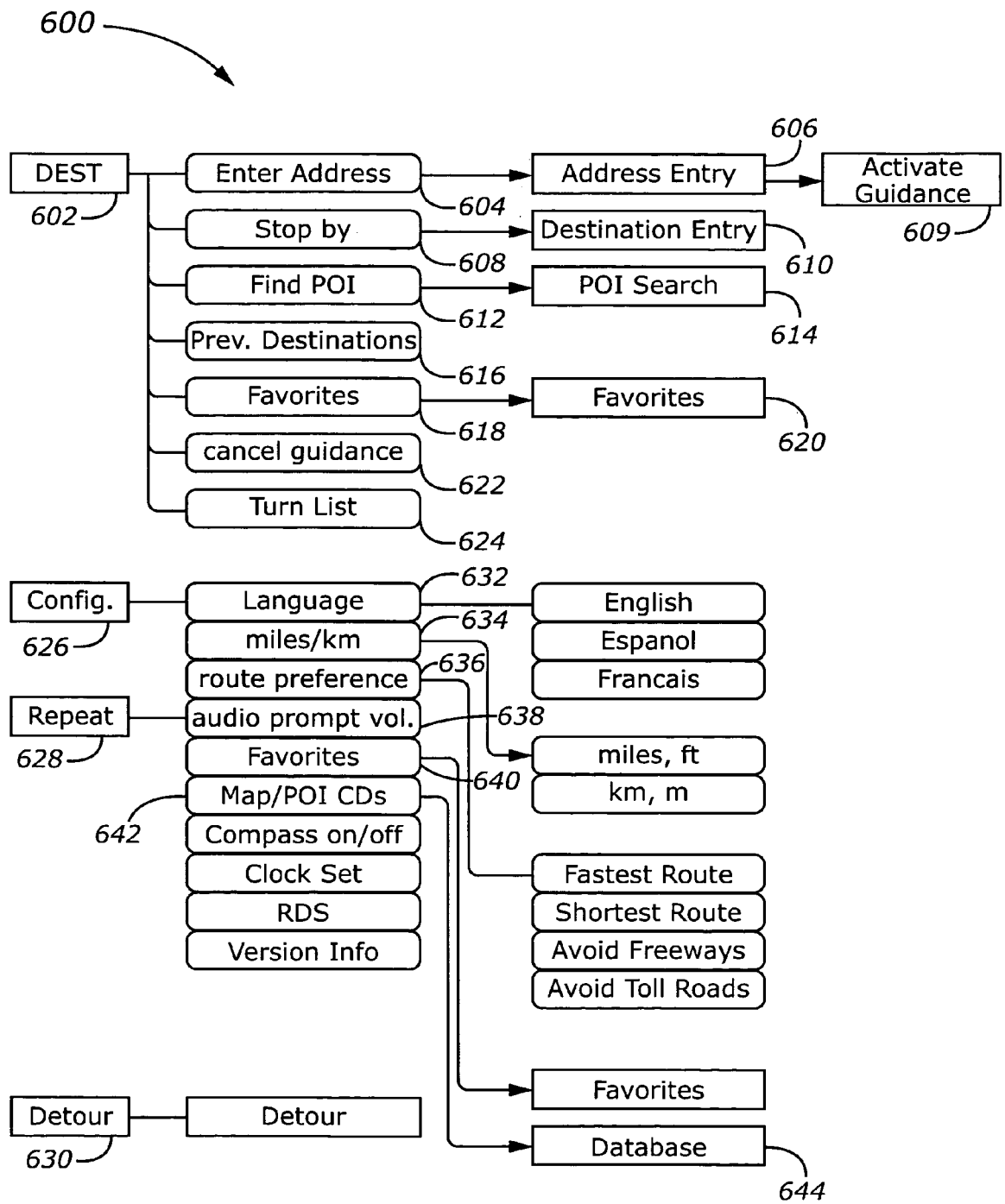
FIG. 6 is a flow diagram of an exemplary control sequence for an automobile navigation system.

In accordance with one exemplary embodiment of an automobile navigation system, a top-level menu of selections 600 available in system 100 (FIG. 1) is illustrated in FIG. 6. For example, a driver can initiate a route guidance mode by activating "Destination" menu 602 and entering an address 604, 606 via controls 106. Once the address has been entered, the system typically calculates a route from the present vehicle position to the destination address. The driver can then typically activate the recommended route guidance by pressing an appropriate soft key, such as an "Activate Guidance" key 609. The driver can also typically exit the route guidance by depressing another soft key, such as "cancel guidance" 622.

In an exemplary embodiment, the driver can be given additional options in the Destination menu 602, as indicated in FIG. 6, such as making an intermediate "stop by" 608, 610 (if route guidance is active), finding a POI 612, 614, going to a previous destination 616, or to a "Favorite" destination 618, 620, or activating a "Turn List" 624.

Another menu typically available to the driver, as shown in the exemplary flow diagram of FIG. 6, is the "Configuration" menu 626. In the Configuration menu 626, the driver can typically select various options, such as "Language" 632, "miles/km" 634, "route preference" 636, "audio prompt volume" 638, "Favorites" 640, "Map/POI CDs" 642, and so forth.

Figure 7:
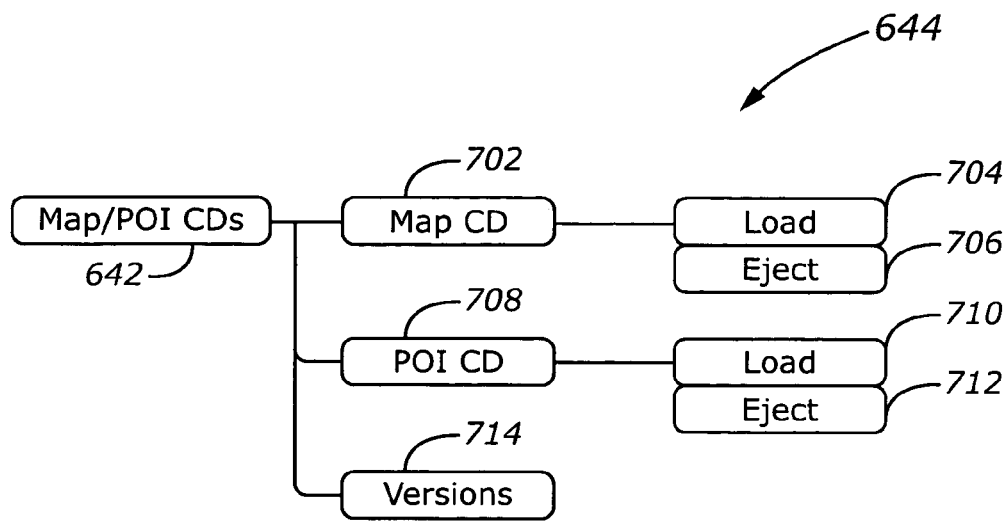
FIG. 7 is a flow diagram of an exemplary control sequence for database loading and unloading.
Figure 8:
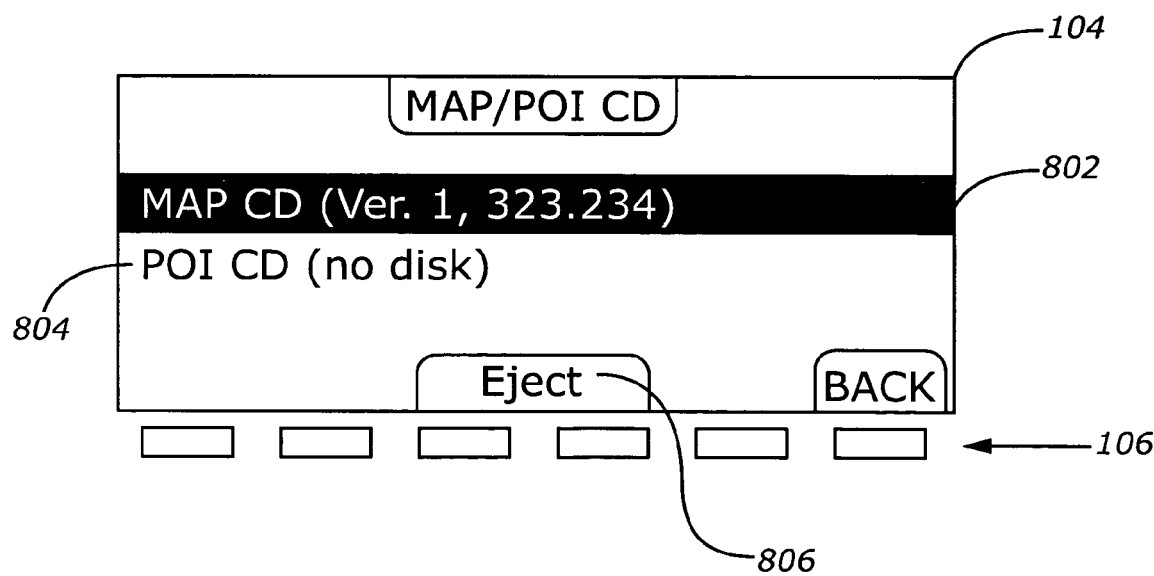
FIG. 8 is an illustration of an exemplary "MAP/POI" display.

For example, one embodiment of a Map/POI CD 642 option and its extension Database 644 is illustrated in the flow diagram of FIG. 7. In this exemplary embodiment, the selection of Map/POI CD 642 typically enables the driver to access Database 644. As such, the driver can generally load (704) or eject (706) a Map CD (702), and can generally also load (710) or eject (712) a POI CD (708). The corresponding display for the Map/POI CD 642 mode is illustrated in FIG. 8, which typically indicates the status of the Map CD (702) and the POI CD (708), as well as the respective version (714). In this example, display 104 shows that a Map CD is installed (802), while the POI CD slot is shown to be empty (804). The Database 644 menu typically allows a selected installed disk (e.g. Map CD 702) to be ejected via a soft key, such as EJECT 806. On the other hand, if POI CD 708 were selected, the absence of an installed POI disk (804) would typically change the "EJECT" designation to "LOAD".

As noted above, database 114 (FIG. 1) can be implemented with suitable media, such as CD, DVD, etc., to provide road-network/address (Map) data and POI data, as well as audio playback. In an exemplary embodiment, database 114 is typically implemented with an internal disk changer (CDX) that provides both audio playback and database access for road-network/address (Map) and POI data. The exemplary CDX typically contains at least six slots, including two dedicated slots, although alternate embodiments may have any number of slots. One of these dedicated slots is typically used for a road-network/address database disk, and the other dedicated slot is typically used for a POI database disk. These dedicated slots are generally not used for audio disks, and are generally not accessed using the audio disk load/unload controls. Rather, the dedicated slots are typically optimized for minimal change time (e.g., less than 6 seconds) between the Map and POI disks. The remaining slots of the CDX can be used for audio CD/MP3/WMA, and other types of compressed digital audio formats, in accordance with driver selection. Alternatively, other embodiments may implement database 114 with other types of media, and with or without audio playback devices.

The exemplary system database may be implemented with separate Map and POI disks, instead of a single combined Map/POI disk. Maintaining separate disks provides increased system flexibility, since each individual database disk can be updated separately, and different configurations of each database disk can be used for different driving situations. Moreover, if an external database (e.g., POI from a remote source) is used with the exemplary system, some, or all, of the internal database (e.g., POI) could be eliminated, or it could be used as a supplement in conjunction with the external database.

The internal disk changer (CDX) in the exemplary system typically provides automatic switching between audio and navigation disks in accordance with driver selection. As such, the driver may not have to switch disks manually between audio and navigation modes. In contrast, some types of premium navigation systems use two dedicated CD or DVD mechanisms for the navigation and audio modes, which is generally a more costly alternative than the CDX configuration of the exemplary navigation system.

To further enhance the driving experience while using the exemplary navigation system, an audio disk playback can be buffered in memory (e.g., approximately 1 to 2 minutes, or any other period of time) to allow for switching disks without interrupting the audio playback. For example, if a route recalculation is needed while an audio disk is playing, the disk switching process (audio to navigation to audio) can take place automatically without interrupting the audio playback. This feature can also minimize driver distraction, since there would generally be no interrupt type of message display to divert the attention of the driver.

Referring again to FIG. 6, another exemplary feature available when route guidance is activated is a "Turn List", which the driver can access by pressing an appropriate soft key 624 in the Destination 602 menu. The Turn List typically displays a summary of distance, direction and turn-into street names of upcoming turns. As noted previously, the exemplary embodiments disclosed herein do not typically include a color map display, in order to reduce the cost and complexity of the system. Instead, turn-by-turn information is generally supplied to the driver in both visual and audio forms, as will be described below. As such, the exemplary embodiments disclosed herein can be categorized as "Turn-By-Turn" navigation systems.

Additional exemplary selective modes may also be made available to the driver, as are illustrated in FIG. 6, such as "Repeat" 628 and "Detour" 630, among others. The various optional features extending from these additional exemplary modes are generally accessible to the driver through the activation of appropriate sequences of soft keys, as indicated in the exemplary respective flow diagrams of FIG. 6.

Figure 9:
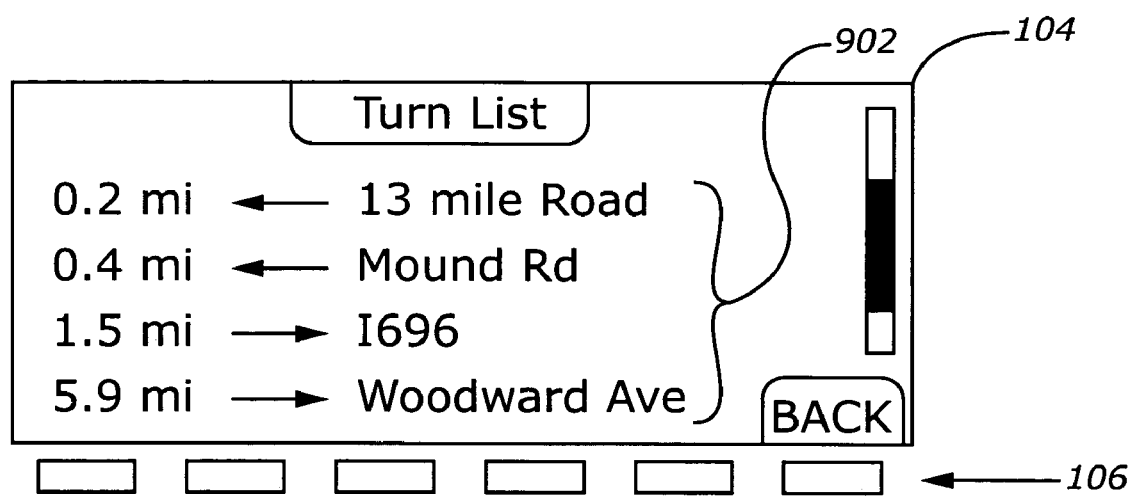
FIG. 9 is an illustration of an exemplary "Turn List" display.

In an exemplary embodiment of a "Turn-By-Turn" navigation system, one visual form of turn-by-turn information is typically the Turn List, as previously described. An exemplary Turn List 902 is generally shown in tabular form on display 104, as illustrated in FIG. 9. In this display example, the distance, direction, and turn-into street names of upcoming turns are listed in simple, easy-to-read format. For example, the first line in the displayed listing indicates an upcoming left turn, 0.2 miles ahead, onto 13 mile Road.

Figure 10:
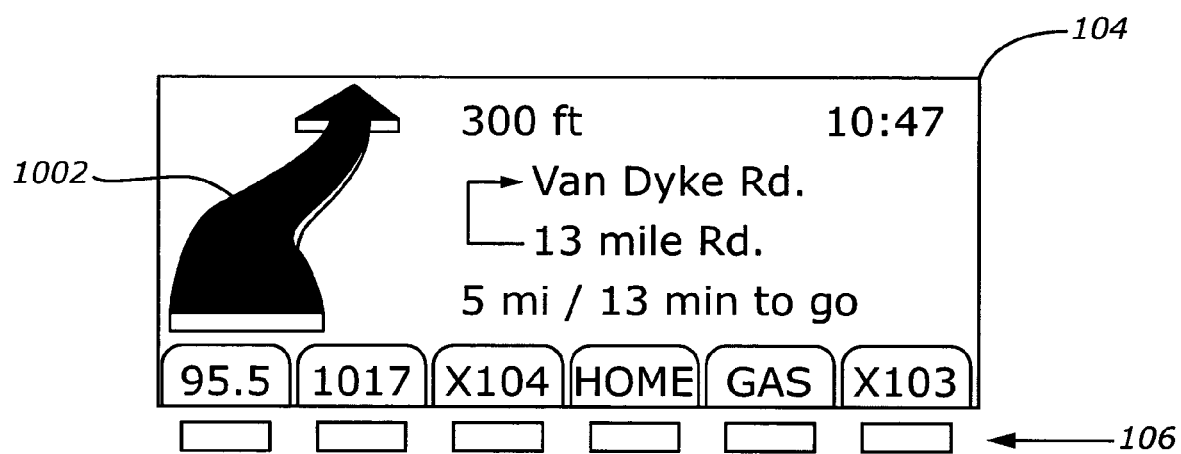
FIG. 10 is an illustration of an exemplary turn icon display in a "Navigation Only" mode.

Another exemplary visual form of turn-by-turn information is shown in FIG. 10, where a turn icon 1002 is presented graphically on display 104 to indicate an upcoming turn. In this example, route data is shown on display 104 as would be typically presented in the "Navigation Only" mode.

In addition to the types of visual displays described herein, various embodiments of exemplary Turn-By-Turn navigation systems generally incorporate audible voice prompts. Voice prompts are typically synchronized with visual turn instructions in order to help the driver navigate to the desired destination with minimal visual distraction. For example, voice prompts can announce an upcoming turn in three steps, as follows:

1) A first voice prompt may suggest: "Prepare to turn".
2) A second voice prompt may announce detailed turn instructions, such as: "Turn right onto I 75 north in one half mile".
3) A final prompt may be played immediately before the turn must be made: "Turn right now".

Figure 11:
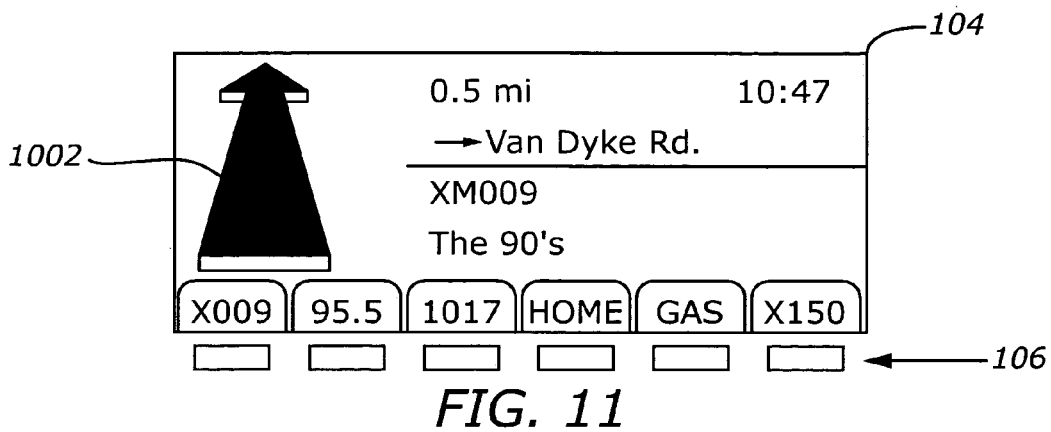
FIG. 11 is an illustration of an exemplary turn icon display in a split "Nav/XM" mode.

To further aid the driver in processing turn information, the previously described turn icon (1002 in FIG. 10) can be graphically enhanced in various ways. For example, when an upcoming turn is still a considerable distance away, such as 0.5 mile or more, turn icon 1002 can be displayed as an arrow pointing straight ahead, as illustrated in FIG. 11. Also, the exemplary displayed data in FIG. 11 is representative of the Split Radio/Nav mode, where XM is the selected audio mode.

Figure 12:
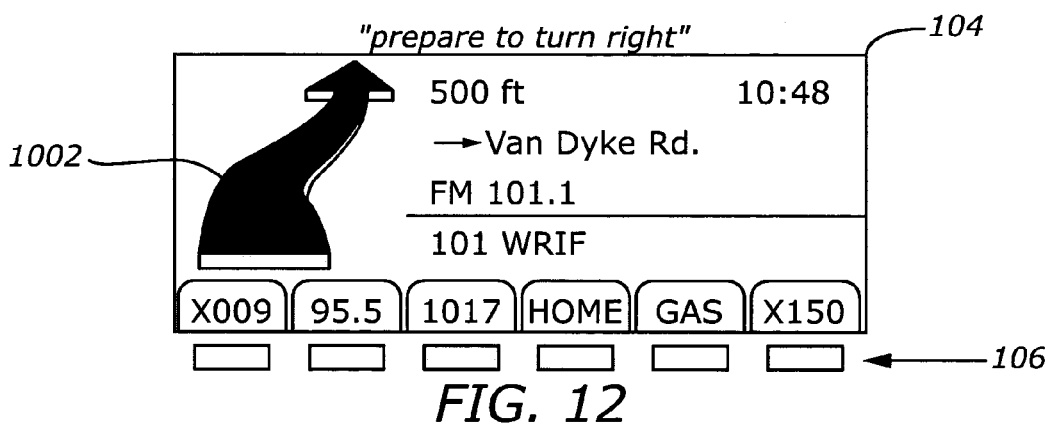
FIG. 12 is an illustration of an exemplary turn icon display in a split "Nav/FM-RDS" mode.

When the vehicle reaches a distance of approximately 500 feet from the upcoming turn, turn icon 1002 can be displayed as a bent arrow, as illustrated in FIG. 12. Concurrently, a voice prompt can announce: "prepare to turn right".

In this example, the displayed data is representative of the Split Radio/Nav mode, where FM-RDS is the selected audio mode.

Figure 13:
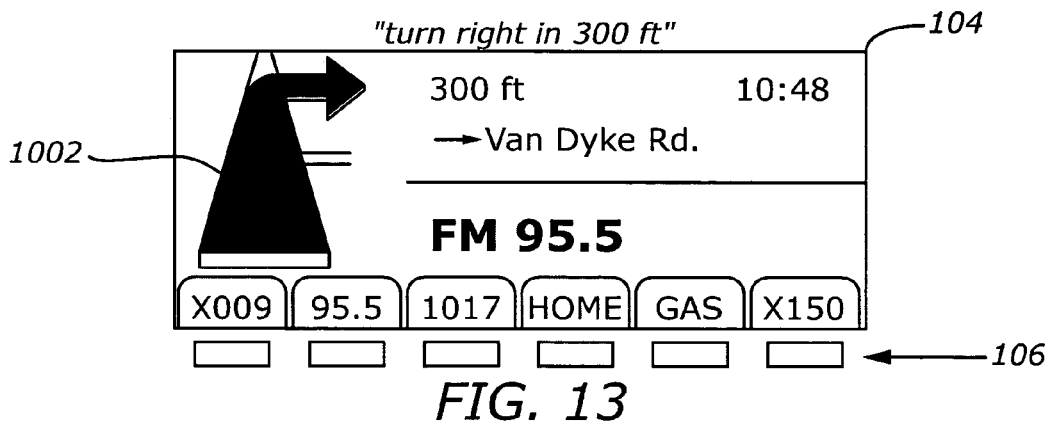
FIG. 13 is an illustration of an exemplary turn icon display in a split "Nav/FM" mode.

When the vehicle begins to approach the upcoming turn, e.g., at about 300 feet, turn icon 1002 can be displayed as a right-angle arrow, as illustrated in FIG. 13. Concurrently, a voice prompt can announce: "turn right in 300 feet". In this example, the displayed data is representative of the Split Radio/Nav mode, where FM is the selected audio mode.

Figure 14:
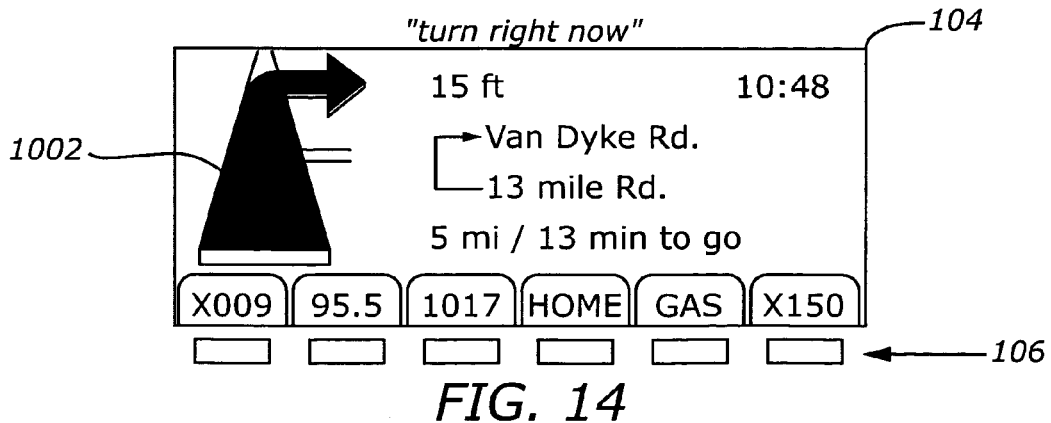
FIG. 14 is an illustration of an exemplary turn icon display in a "Navigation Only" mode.

When the vehicle is close to the upcoming turn, e.g., at a distance of about 15 feet, turn icon 1002 can revert to a right-angle arrow, as depicted in FIG. 14. Concurrently, a voice prompt can announce: "turn right now". In this example, the displayed data is representative of the Navigation Only mode, with no audio selection.

Accordingly, the shortcomings of the prior art have been overcome by providing an improved automobile navigation system based on a turn-by-turn route guidance concept. Exemplary embodiments of a versatile, yet economical, navigation system are disclosed, with a graphic turn icon and associated visual and voice prompt instructions used in lieu of a costly color map display. A dual use CD-ROM changer, or similar device, can be incorporated into the exemplary navigation system for both audio and Map/POI disk access. Separate Map and POI disks are typically installed in dedicated slots of the disk changer to minimize switching time and to allow for individual Map or POI database upgrades, while audio disks can be installed in the remaining slots. Moreover, audio disk buffering can be employed to enable audio-to-navigation-to-audio disk switching without interrupting an audio playback. The exemplary embodiments described herein can provide enhanced operating capabilities in a relatively low cost automobile navigation system, with convenient and intuitive controls integrated into the radio system to minimize driver distraction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A turn-by-turn navigation system for a vehicle, comprising:
    a control unit having a visual display and destination selection controls;
    a processor electrically coupled to the control unit and configured to receive destination selections from the control unit;
    an internal disk changer coupled to the processor and configured to simultaneously accept both audio and navigation disks, wherein the internal disk changer comprises at least one dedicated slot for the navigation disks, and wherein the navigation disks are configured to provide a database comprising road network/address information; and
    a vehicle location apparatus configured to input vehicle location data to the processor;
    wherein the processor is configured to generate route information on the visual display between the vehicle location and a selected destination based on received vehicle location data from the vehicle location apparatus, on received destination selection information from the control unit, and on received road-network/address data from the database, and wherein the processor is further configured to access the navigation disks in the internal disk changer without interrupting playback of audio tracks obtained from the audio disks.

2. The turn-by-turn navigation system of claim 1 wherein the internal disk changer comprises non-dedicated slots for the audio disks.

3. The turn-by-turn navigation system of claim 1 wherein the internal disk changer slots dedicated for the navigation disks are optimized for minimal change time.

4. The turn-by-turn navigation system of claim 1 wherein the navigation disks comprise a Map disk and a separate Point of Interest (POI) disk.

5. The turn-by-turn navigation system of claim 4 wherein the Map disk and the Point of Interest (POI) disk are independently replaceable.

6. The turn-by-turn navigation system of claim 5 wherein the Map disk and the Point of Interest (POI) disk are independently upgradeable.

7. The turn-by-turn navigation system of claim 2 wherein the audio disks comprise compressed digital audio formats.

8. The turn-by-turn navigation system of claim 4 wherein the Map disk and the POI disk are manually accessed for loading and ejecting.

9. The turn-by-turn navigation system of claim 1 wherein the Map disk and the POI disk are automatically switched as needed.

10. The turn-by-turn navigation system of claim 1 wherein an audio disk plays back through the radio.

11. The turn-by-turn navigation system of claim 1 wherein audio disk playback is buffered in a memory.

12. The turn-by-turn navigation system of claim 11 wherein the audio playback is buffered for a time period in an approximate range of one to two minutes.

13. A method of providing uninterrupted audio disk playback while temporarily accessing a navigation disk in a navigation system for a vehicle, comprising the steps of:
    buffering the audio playback in a memory;
    accessing the navigation disk; and
    switching back to the audio disk, wherein the audio playback continues without interruption during the accessing and switching of the navigation disk.

14. The method of claim 13 wherein the audio disk playback is buffered for a time period in excess of one minute.

* * * * *